United States Patent [19]

Beynet et al.

[11] Patent Number: 4,905,776

[45] Date of Patent: Mar. 6, 1990

[54] SELF-BALANCING DRILLING ASSEMBLY AND APPARATUS

[75] Inventors: Pierre A. Beynet; James F. Brett, both of Tulsa; Tommy M. Warren, Coweta, all of Okla.

[73] Assignee: Amoco Corporation, Chicago, Ill.

[21] Appl. No.: 297,204

[22] Filed: Jan. 17, 1989

[51] Int. Cl.⁴ .................. E21B 17/00; F16F 15/14; F16F 15/16; B23B 47/00
[52] U.S. Cl. .................................. 175/56; 175/320; 74/573 R; 74/573 F; 74/574; 408/143; 464/180
[58] Field of Search ............... 175/55, 56, 327, 424, 175/320; 166/104, 177, 249; 464/180; 408/143; 409/141; 74/573 R, 573 F, 574

[56] References Cited

U.S. PATENT DOCUMENTS

| | | | |
|---|---|---|---|
| 2,814,462 | 11/1957 | De Jarnett | 175/56 |
| 2,953,351 | 9/1960 | Bodine et al. | 175/56 |
| 3,696,688 | 10/1972 | Goodrich et al. | 74/573 R |
| 3,754,835 | 8/1973 | Ivanov et al. | 175/107 |
| 4,075,909 | 2/1978 | Deakin | 464/180 |
| 4,522,271 | 6/1985 | Bodine et al. | 175/56 |
| 4,626,144 | 12/1986 | Berner | 74/593 R |
| 4,674,356 | 6/1987 | Kilgore | 74/573 R |
| 4,776,436 | 10/1988 | Nenkov et al. | 175/321 |

Primary Examiner—Bruce M. Kisliuk
Attorney, Agent, or Firm—Scott H. Brown; Fred E. Hook

[57] ABSTRACT

A vibration dampening assembly, such as a dynamic balancing apparatus, is connected to a drill bit, a downhole motor or drillstring to exert a variable force to counteract vibration inducing forces. The dynamic balancing apparatus includes a support body which supports a plurality of freely movable masses so that the masses move to a position for opposing an imbalance force which rotates with, and at the same speed as, the drill bit, downhole motor or drillstring.

2 Claims, 7 Drawing Sheets

SELF-BALANCING DRILLING ASSEMBLY AND APPARATUS

BACKGROUND OF THE INVENTION

1. Field of the Invention

This invention relates to a drilling assembly and apparatus for balancing rotation of a drill bit or other portion of a drillstring and more particularly, but not by way of limitation, to a self-balancing apparatus for automatically compensating at least some imbalances which cause vibrations in a rotating drill bit.

2. Setting of the Invention

In drilling an oil or gas well, forces arise which can induce vibrations in the drill bit and/or other portions of a drillstring. These vibrations can cause early and catastrophic bit failure and reduced rates of penetration. The detrimental effects of vibrations have been found to be even more pronounced when operating at high rotational speeds, such as are obtained through the use of downhole drilling motors.

Such vibrations in a drill bit are also known as "backward whirl" or "bit whirl." This is the phenomenon wherein the drill bit spirals about the longitudinal axis of the borehole which is cut by the drill bit. When a drill bit vibrates or whirls, the cutting elements on the face of the bit travel at an average cutting speed which is greater than the speed at which the cutting elements would rotate on a true (i.e, non-whirling) drill bit. The cutting elements also travel sideways and backwards during whirl, and they can experience severe impact loads. As a result, the drill bit can wear out prematurely and the rate of penetration obtainable with such a bit can decrease. The wear and rate of penetration decrease can be catastrophic in that the drill bit can lose all of its cutting elements, and the drilling process will be stopped.

At high drilling speeds achieved through the use of drilling motors, such as conventional turbine or positive displacement motors, vibrations and bit whirl can be caused by a mass imbalance of the rotating assembly and/or drilling force imbalances; and/or if the entire drill string is rotating, it is another source of vibrations.

Mass imbalance is that imbalance force caused by an unbalanced distribution of mass on the rotating member (e.g., the drill bit). Although mass imbalance might be compensated for by carefully manufacturing the drill bit to insure a symmetrical distribution of mass, such static compensation techniques might be costly to manufacture or implement, would likely not be able to compensate during wearing of the drill bit which creates changes in the mass distribution, and would likely not compensate for the variable drilling force imbalance which is believed to be the main cause of harmful vibrations.

The cause of drilling force imbalance is described in copending U.S. patent application Ser. No. 133,684, filed Dec. 15, 1987, and assigned to the assignee of the present invention. Copending U.S. patent application Ser. No. 133,684 now U.S. Pat. No. 4,815,342 is incorporated herein by reference; however, a brief description of drilling force imbalance will be given herein.

When a drill bit is rotated, all of the forces normally applied to the bit act through the individual cutter elements disposed across the face of the bit. These forces can be resolved into an equivalent set of orthogonal forces and moments acting on the bit. The main moment is the torque required to spin the bit. The axial component of the orthogonal forces is the applied weight on the bit. The imbalance force arises if the nonaxial component of the contact forces between the rock and bit is not zero. This occurs when the vector sum of nonaxial force components of the forces acting on the cutting elements does not equal zero. This imbalance force will change with different operating conditions, with different formations, and as the bit wears. At any instant in time, however, the nonaxial imbalance force rotates with the bit at the speed of the bit. Because this imbalance force rotates in phase with the bit, the effect of the rotating imbalance force is additive to any mass imbalance.

In view of the problems which can arise due to mass imbalance and drilling force imbalance, there is the need for an apparatus and drilling assembly which automatically compensate for these imbalances to prevent vibrations from beginning. It is contemplated that accomplishing this would prevent or reduce premature bit failure and decreased rates of penetration arising from the described imbalances. Such apparatus and assembly should be able to make compensations automatically under dynamic conditions.

SUMMARY OF THE INVENTION

The present invention is contemplated to overcome the foregoing deficiencies and meet the above-described needs. For accomplishing this, the present invention provides a novel and improved apparatus for balancing the rotation of, in particular, a drill bit and a drilling assembly particularly incorporating such an apparatus. The apparatus of the present invention is a self-balancing device which automatically compensates for imbalances caused by forces rotating at the same speed as the member, such as a drill bit, being compensated. The apparatus provides dynamic, as opposed to static, compensation in that the compensating force changes as the imbalance to be compensated changes.

The present invention particularly provides an apparatus for balancing rotation of a drill bit, and comprises mass shifting means, responsive to an imbalance force rotating with the drill bit, for moving a mass at a fixed radius relative to the central axis of the drill bit so that the mass moves to a position for opposing the imbalance force. The apparatus also comprises means for connecting the mass shifting means to the drill bit.

The present invention provides a drilling assembly comprising a drillstring including at least a portion which is rotatable and which is subject to a vibration-inducing force exerted thereon during rotation. The drilling assembly further comprises dynamic balancing means, connected to the drillstring, for exerting a movable force on the drill string to counteract the vibration-inducing force. In the preferred embodiments, the dynamic balancing means is implemented by the aforementioned apparatus.

It is contemplated that the present invention is particularly useful for balancing a drill bit during the drilling of oil or gas wells so that there is a reduced likelihood of premature failure of the bit and a reduced likelihood of decreased rates of penetration due to either a mass imbalance or a drilling force imbalance.

DETAILED DESCRIPTION OF THE PREFERRED EMBODIMENTS

The present invention automatically compensates for imbalances caused by forces rotating at the same speed as a drill bit or other rotating component to be compensated. Specific forces include those referred to as mass imbalance and drilling force imbalance. The compensation provided by the present invention is intended to prevent vibrations and/or backward whirl from beginning.

Figure 1:
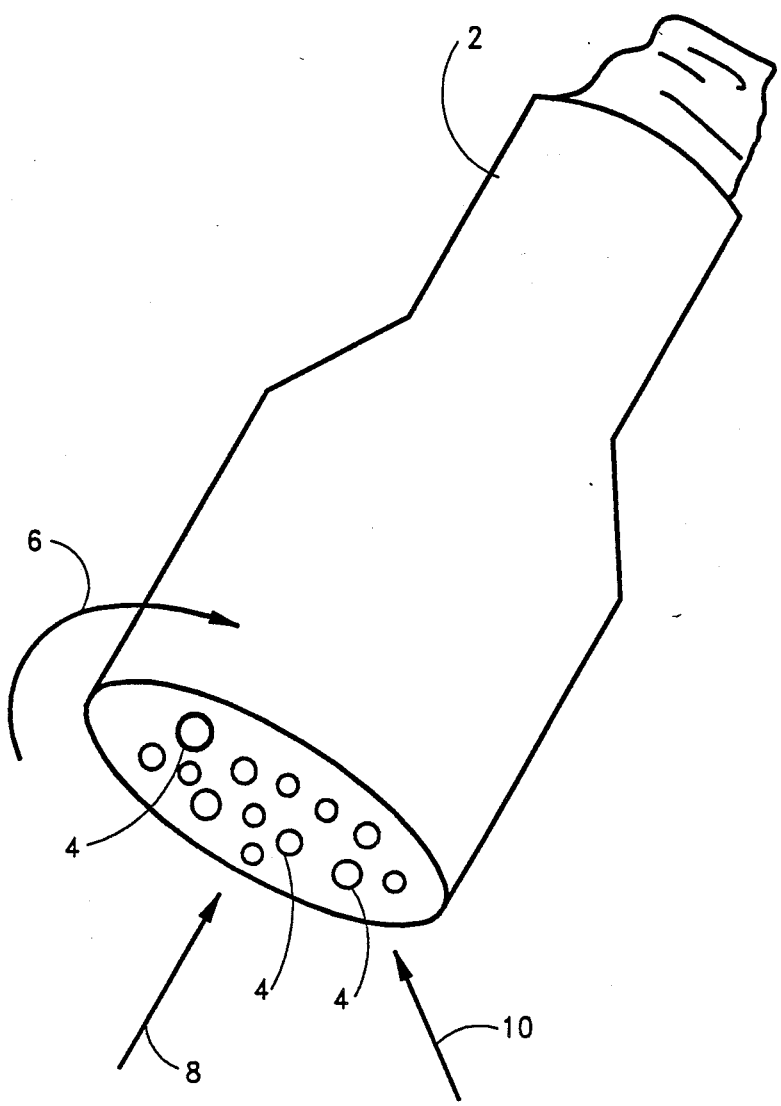
FIG. 1 is a schematic perspective view of a drill bit used to show drilling forces exerted on the bit during drilling.

Mass imbalance typically arises from a structural asymmetry arising either from original manufacture or wear during usage, for example. The drilling force imbalance, which is believed to be the primary force tending to cause such vibrations or backward whirl, is schematically represented in FIG. 1, wherein is shown a drill bit 2 which includes a plurality of cutting elements 4, such as polycrystalline diamond compact (PDC) members mounted on tungsten carbide studs distributed across the face of the drill bit 2 in a known manner. As the drill bit 2 is rotated in a conventional manner, the cutting elements 4 engage the material to be drilled. This action imposes forces on the individual cutting elements 4. These forces can be resolved into an equivalent set of orthogonal forces and a moment acting on the bit 2. The moment is the torque required to spin the bit 2 and is represented in FIG. 1 by the arrow 6. The orthogonal forces include a net axial force 8 which is the applied weight on the bit. The orthogonal forces can also include a net nonaxial force when the vector sum of the nonaxial force components do not equal zero. The nonaxial force is represented by the arrow 10 in FIG. 1. The nonaxial force 10 is the major part of the imbalance force and rotates with and at the same speed as the drill bit 2 (as does the mass imbalance force).

The forces shown in FIG. 1, and the mass imbalance force, can act on other parts of the entire rotating assembly, such as the rotor of a downhole drilling motor and/or the string of drill pipes and drill collars to which the motor and the bit are connected. The present invention will, however, be described for convenience with reference to correcting imbalances at the drill bit 2, but such description should not be taken as limiting the present invention.

Figure 2:
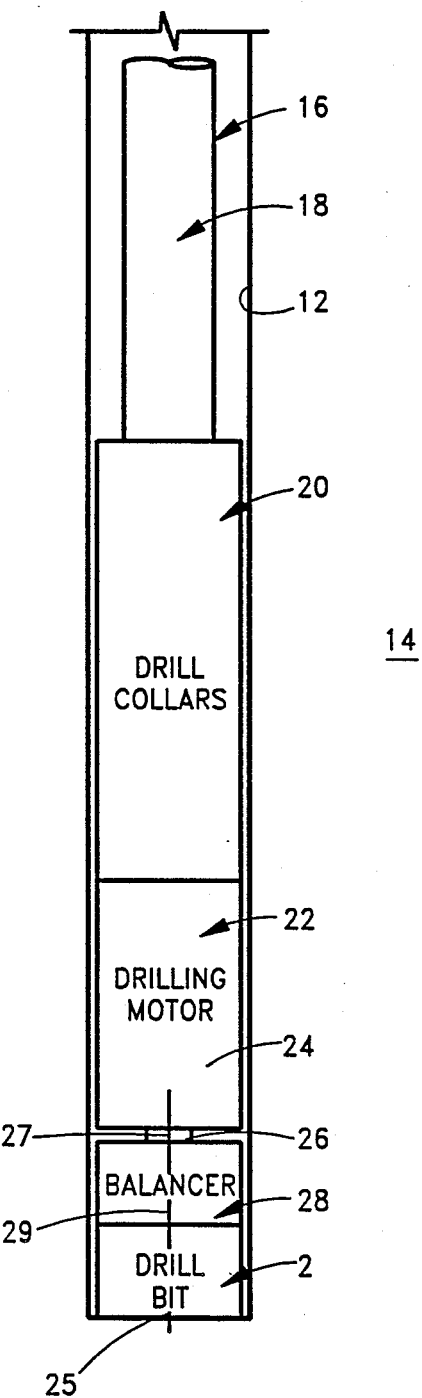
FIG. 2 is a schematic block diagram of a conventional drillstring in which the balancer apparatus of the present invention is connected.

Referring now to FIGS. 2-11, the preferred embodiments of the present invention will be described. As illustrated in FIG. 2, this description will be made in the context of drilling a well bore 12 through one or more subterranean earthen formations 14. To form the well bore 12, a drilling assembly is used. The drilling assembly of the preferred embodiment of the present invention comprises a conventional drillstring 16 which includes a plurality of drill pipes 18 to which are connected drill collars 20, a drilling motor 22, either of the turbine or positive displacement type, and the drill bit 2. The drilling motor 22 includes a stator 24 in which a rotor 26 is rotatably mounted in a manner known to the art. The drill bit 2 and the rotor 26 have central longitudinal axes of rotation 25, 27, respectively. In general, the drillstring 16 can include more or less elements than described above and can be used with or without stabilizers as desired; however, the depiction of the drill string 16 given in FIG. 2 is an example of a typical string with which the balancer apparatus of the present invention can be used. In such a typical drillstring at least a portion is rotatable. The entire string 16 can be rotated by surface equipment (not shown) in a known manner [typically at low speeds such as within the range between about 40 revolutions per minute (rpm) and 200 rpm], and the bit 2 can also be rotated by operation of the motor 22 (typically at high speed such as up to 1800 rpm). During such rotation, one or more vibration-inducing forces can be exerted on the rotating portion, thereby tending to cause vibrations or backward whirl.

The balancer apparatus of the present invention is identified in FIG. 2 as the element 28 and is broadly defined as a dynamic balancing device for exerting a variable force on the drillstring 16 to counteract a vibration-inducing force described hereinabove. As previously stated, such a vibration-inducing force is one or more of those which rotate with and at the same speed as the drill bit 2 rotated by the drilling motor 22 and/or the overall drillstring 16. The dynamic balancing device 28 is normally connected in the embodiment shown in FIG. 2 between the rotor 26 and the drill bit 2. However, the motor 22 may or may not be used in conjunction with the balancing device 28. Further, the balancing device 28 can be built into/as part of the drilling motor 22 or within the drillstring 16.

Broadly, the dynamic balancing device 28 of the preferred embodiments includes a plurality of masses retained on the drillstring 16 so that the masses are free to move along a path about the drillstring 16.

As particularly applied to balancing the drill bit 2, the dynamic balancing device 28 counteracts the imbalance force 10 which is the primary cause of the drill bit 2 to exhibit backward whirl in response to rotation of the drill bit 2 on the rotor 26. The balancing device 28 comprises mass shifting device for moving at least two masses at a fixed radius relative to the central axis 29 so that the mass moves to a position for opposing the imbalance force. The movement of the mass occurs automatically in response to the imbalance force or forces rotating with the drill bit 2. The primary force of these imbalance forces is the net nonaxial force 10 identified in FIG. 1. The balancing device 28 further comprises mechanism for connecting the mass shifting device to the drill bit 2. In the preferred embodiment illustrated in FIG. 2, this connection is also made to the rotor 26 so that the central axes of rotation 25, 27, 29 of the drill bit 2, the rotor 26 and the mass shifting device of the balancer means 28 are substantially collinear ("substantially collinear" means collinear and slight deviations therefrom as may occur in actual implementation). In a second embodiment, the balancing device axis 29 is colinear with the rotor axis 27, but not colinear with the drill bit axis 25 to reduce bit whirl.

Figure 3:
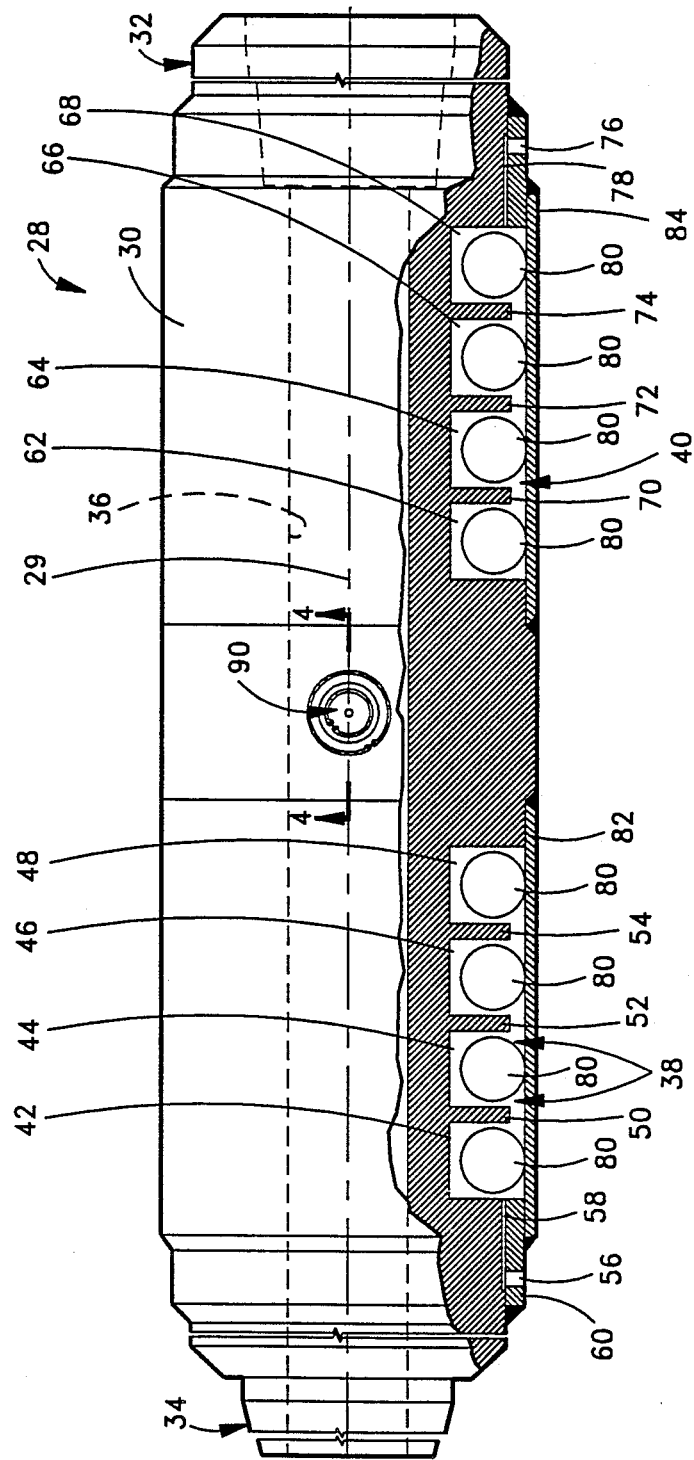
FIG. 3 is a partially sectioned view of a preferred embodiment of the balancer apparatus of the present invention.
Figure 4:
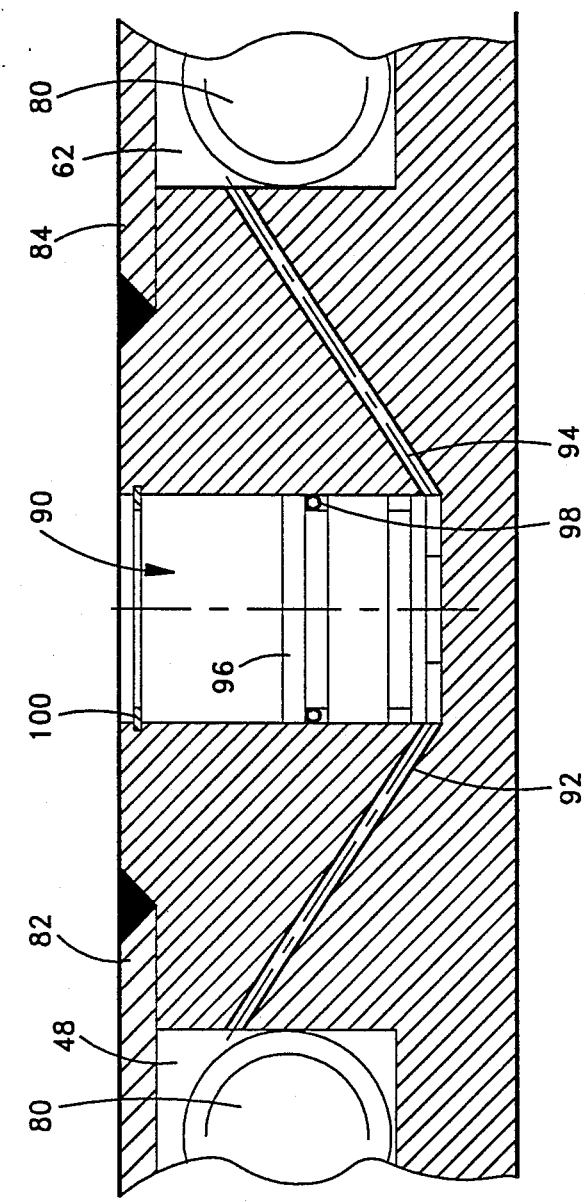
FIG. 4 is a sectional view of part of the embodiment shown in FIG. 3 as taken along line 4—4 shown in FIG. 3.
Figure 5:
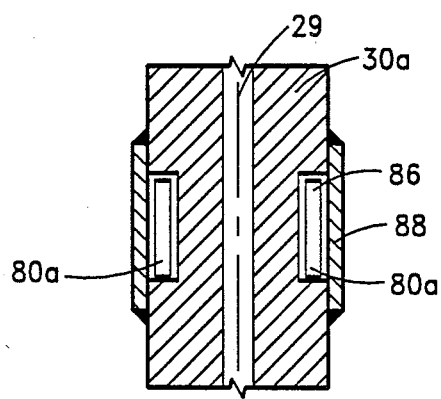
FIG. 5 is a sectioned schematic representation of part of another embodiment of the balancer apparatus of the present invention.
Figure 6:
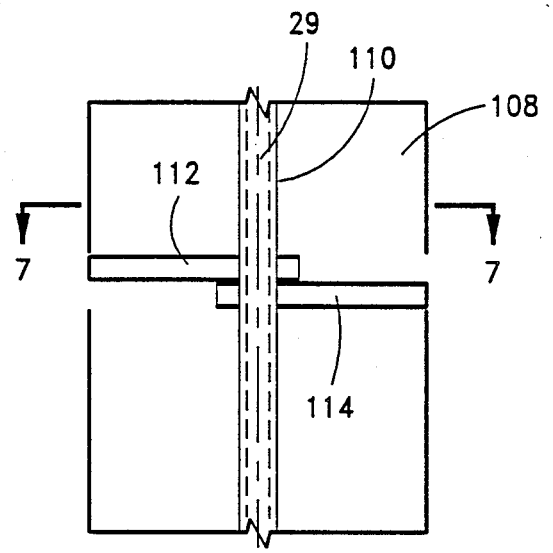
FIG. 6 is a schematic representation of still another preferred embodiment of the balancer apparatus of the present invention.
Figure 7:
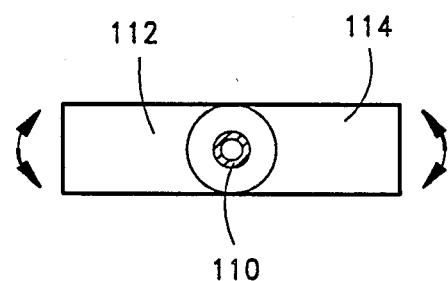
FIG. 7 is a schematic illustration taken along line 7—7 shown in FIG. 6.

Preferred embodiments of the mass shifting device and the connecting mechanism will next be described with reference to FIGS. 3-7. Two embodiments incorporating self-balancing balls retained in circular or cylindrical races are depicted in FIGS. 3-5. In response to an imbalance force, the balls move within the races to counterbalance the imbalance. An embodiment incorporating free swinging pendulum-like masses retained on an axial member is schematically represented in FIGS. 6 and 7. Both of these types of embodiments provide a "Thearle" balancing system (see, Mechanical Vibrations, D. Hartog, McGraw-Hill Book Co., 4th edition, 1956, pages 237-240). In the preferred embodiment depicted in FIG. 2, such a balancing system is placed immediately above the drill bit 2 so that an imbalance force rotating with the drill bit 2 will be reduced or counteracted. This is intended to reduce the likelihood that the drill bit 2 will experience vibrations or backward whirl because such imbalance forces, and particularly the drilling force imbalance, are major contributing factors to a bit's tendency to whirl. It is contemplated that practical designs of a balancing means incorporating the Thearle principle will compensate for mass imbalances up to at least about forty pounds and drilling force imbalances up to at least about 1800 pounds for a nominal 8½ in. drill bit.

In the embodiment shown in FIG. 3, the mechanism for connecting the balancing apparatus 28 of the present invention includes a cylindrical support body 30 having a threaded box end 32 for connecting to the drill bit 2 and a threaded pin end 34 for connecting to the rotor 26. An axial passageway 36 is defined throughout the length of the support body 30 for permitting fluid flow therethrough. The axis of rotation 29 is down the center of the passageway 36. Formed circumferentially around the support body 30 are two sets 38, 40 of grooves or races. The set 38 includes four races 42, 44, 46, 48 partially separated by walls 50, 52, 54. The four races 42, 44, 46, 48 are in common fluid communication, and they receive a fluid through a port 56 and a groove or passageway 58. In FIG. 3, the port 56 and the passageway 58 are shown defined by a collar 60 welded to the main portion of the support body 30; however, it is contemplated that it would be preferred to make the support body a unitary integral member with the port 56 and the passageway 58, as well as the sets 38, 40 of races, machined therein.

The set 40 of races is constructed the same as the set 38. The set 40 includes four races 62, 64, 66, 68 partially separated by walls 70, 72, 74, but remaining in common fluid communication for receiving a fluid through a port 76 and a passageway 78. Both the port 76 and the port 56 are designed to receive plugs (not shown) for closing the ports in a conventional manner.

The mass shifting device of the embodiment shown in FIGS. 3 and 4 include multiple pluralities of movable masses, specifically balls or rollers 80, and mechanism for retaining the masses on the support body 30 so that the masses are free to move along a path about the support body 30. In the preferred embodiment, the mechanism for retaining includes the races 42, 44, 46, 48, 62, 64, 66, 68 wherein the pluralities of balls 80 or rollers are disposed. To close the open, circular, circumferential channels defining the races, the means for retaining also includes sleeves 82, 84. The sleeve 82 overlies the set 38 of races and is welded or otherwise suitably connected to the support body 30. The sleeve 84 overlies the set 40 of races and is likewise welded or otherwise suitably connected to the support body 30.

For the embodiment shown in FIG. 3, the races 42, 44, 46, 48 are spaced from each other by the walls 50, 52, 54, but they are longitudinally close to each other in that they are all defined closer to the end 34 than to the end 32 of the support body 30 and are all defined in the same region of the support body 30 received in and closed by the sleeve 82. The races 62, 64, 66, 68 are similarly related to each other but closer to the end 32 of the support body 30 and in the same region of the support body received in and closed by the sleeve 84. The sets 38, 40 themselves are longitudinally spaced from each other a substantial axial distance to insure full dynamic balancing will be achieved. This construction may better achieve the desired balancing; however, it may not be required. It is contemplated that possibly a single race with a minimum plurality of two balls could be used and achieve balancing within a given application. This would, however, be the minimum. In general, the number of races and the number of balls within each race is dependent upon how imbalanced a particular system is. No direct calculation for determining the minimum number of races and balls to balance a drill bit is presently known; however, it is believed that empirical determinations can be made if desired to achieve a minimum design for a particular application. Based on tests described herebelow, the preferred embodiment shown in FIGS. 3 and 4, containing the two sets 38, 40 of four races each, with four 1½-inch diameter tungsten carbide balls 80 contained in each race, can balance or counteract imbalance forces acting on a conventional 8½ in. drill bit.

One contemplated modified embodiment is illustrated in FIG. 5. In this embodiment there is a single race 86 defined in the support body 30a. The race 86 has a longitudinal width substantially greater than the diameter to allow rollers 80a instead of balls (a minimum of two of which are retained in the race 86 by a sleeve 88 welded or otherwise suitably connected to the support body 30a). This design of the race 86 permits the rollers 80a to move circumferentially around the support body 30a and eliminates the need for several races.

Referring again to FIGS. 3 and 4, the embodiment shown therein further comprises pressure compensating mechanisms for compensating for pressure differentials between the fluid contained within the sets 38, 40 of races and a fluid external to the support body 30. This is to keep the fluid inside the races separate from fluids outside the support body 30 and to compensate for pressure differentials. The support body 30 has an aperture 90 defined through its main body as shown in FIGS. 3 and 4. From the bottom of the aperture 90, two channels 92, 94 extend to locations of intersection with the race 48 and the race 62, respectively. Thus, the set 38 of races and the set 40 of races both communicate with the aperture 90. Disposed within the aperture 90 is a piston 96 on which a seal 98 is mounted in engagement with the cylindrical side wall defining the aperture 90. The piston 96 moves within the aperture 90 in response to pressure differentials to achieve the desired compensation. To retain the piston 96 within the aperture 90, a retaining ring 100 is mounted at the mouth of the aperture 90.

Referring next to FIGS. 6 and 7, a schematic illustration of another embodiment of the balancing device 28 of the present invention will be described. This embodiment includes a support means 108 having ends connectible between the drill bit 2 and the rotor 26 in the same manner as the support body 30. The support body 108, however, includes an axial support member 110 to which the mass shifting device of this embodiment is connected.

The mass shifting device of this embodiment includes at least two pivotable mass members connected for independent pivotation about a longitudinal center axis defined by the support member 110 of the connecting mechanism of this embodiment of the balancer apparatus 28. Two such pivotable, horizontal pendulum mass members are illustrated in FIGS. 6 and 7 and identified by the reference numerals 112, 114. In a preferred embodiment each of these includes a pivot arm having an outer end and an inner end, with the inner end connected to the axial support member 110 so that the pivot arm is retained for pivotation about the axial support member 110. This could be provided by suitable journaling such as with bearings. Each pivotable mass member also preferably includes a counterbalance weight at the outer end of the pivot arm. This counterbalance weight could be integral with the pivot arm or attached thereto.

Regardless which of the previously described embodiments is used in the drilling assembly depicted in FIG. 2, the materials and modes of construction are of any suitable type for the intended use environment and for obtaining the desired compensation. Regardless of the particular embodiment, the compensation for the imbalance(s) occurs based upon the same principle. That is, either the balls or the pendulums compensate for imbalance by forcing the drill bit, motor or drillstring, to rotate around a desired axis regardless of mass or drilling force imbalance. The net mass center of the balls or pendulums will automatically adjust itself so that the drill bit, motor or drillstring will be forced to rotate around the center of the races or the center of pivotation of the pendulums. This automatic balancing reduces vibration in a manner analogous to how the balancing of the wheels on a car reduces vibration there.

The principle of operation of the balls and the pendulums is the same as the principle used in the Thearle device. This principle provides that if the race or the center of pivotation of the pendulums tends to rotate off-center, the balls or pendulums will automatically move to the exact position necessary to tend to force the assembly to rotate about its center. It is to be noted that this balancing is effective only above the critical speed for the rotating assembly.

It is to be noted that the automatic balancing adjustment will be temporarily disturbed by a rapid rotational acceleration or deceleration of the assembly. Once the system is above critical speed, however, the moving masses will move to reduce vibrations. Damping of the moving masses, such as could be accomplished by adjusting the viscosity of the fluid inside the races for the FIGS. 3–5 embodiments, might help alleviate any problems with rapid accelerations.

It is to be further noted that this operation achieved with the present invention is distinguishable from a balanced mass sub which functions as a static mass, such as a flywheel. Although the rotation of such a static mass might have some tendency to reduce vibrations, it cannot compensate in a dynamic manner as conditions change, such as during drilling. For example, during rotation of the drilling assembly depicted in FIG. 2, the mass of the drill bit 2 can change as it wears. Wear causes changes in the mass imbalance and also in the drilling force imbalance which would likely not be compensated by a balanced mass sub. Therefore, the present invention provides an automatic compensating apparatus which functions in a dynamic, changing environment.

An experiment to prove the inventive concept was conducted utilizing an embodiment similar to that shown in FIGS. 3 and 4, but having only four races, each of which contained about five one-inch diameter tungsten-carbide balls. When rotated at 1200 rpm, local accelerations in the sub approached 100 G's, and the balancer apparatus could provide the force necessary to counteract up to 1800 pounds drilling force imbalance.

Figure 8:
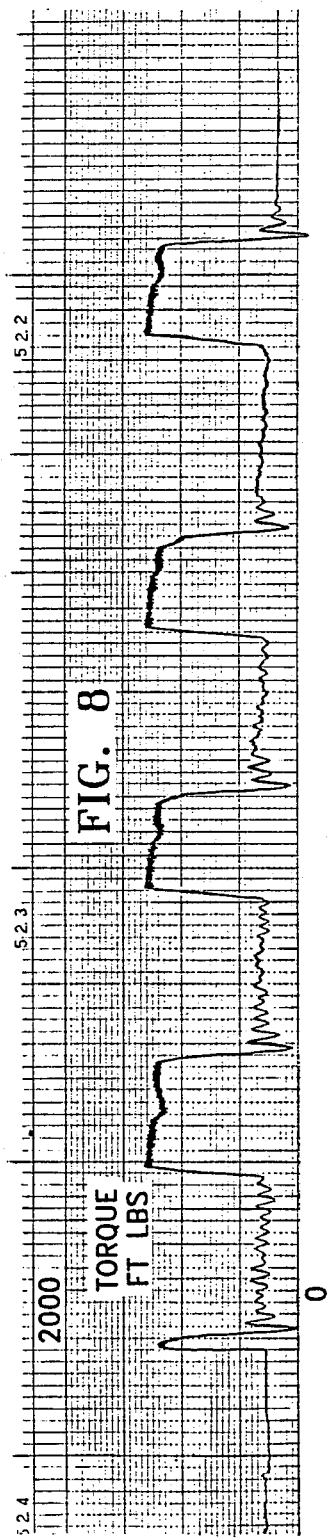
FIG. 8 and 9 are graphs of torque measurements for a conventional drill bit operated without a balancer apparatus of the present invention.
Figure 9:
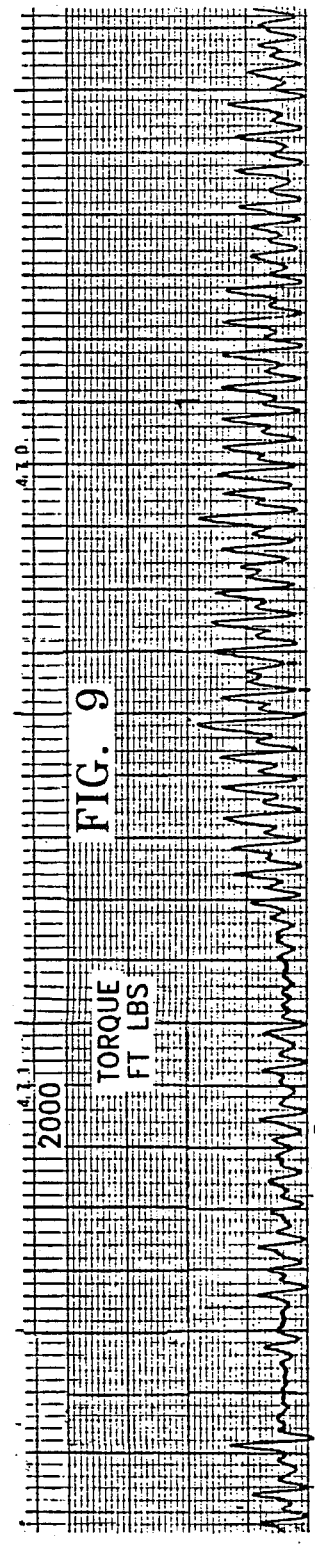
Figure 10:
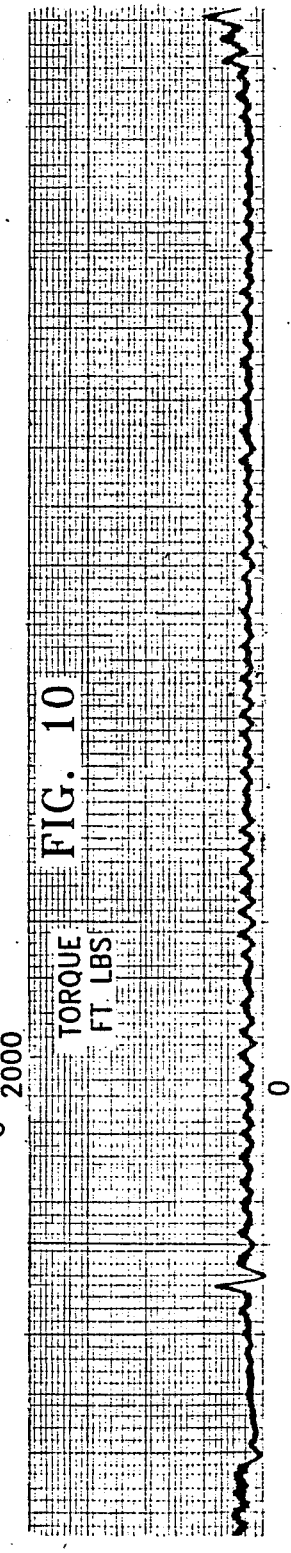
FIG. 10 is a graph of a torque measurement of a conventional drill bit operated with a balancer apparatus of the type shown in FIGS. 3 and 4.

The balancer was tested using a 8½ in. PDC bit (a Diamond Bort Stratabit PD2A), and a seven-inch turbine. Tests conducted with and without the balancer showed that the balancer was useful in eliminating harmful vibrations or backward whirl. FIGS. 8–10 show results typically obtained with and without the balancer. It is to be noted that without the balancer, typical indications of vibrations or whirl were observed. That is, the torque and weight on bit were both erratic, and the bit would hang up and quit drilling. FIGS. 8 and 9 show graphical representations of torque versus time indicating erratic torque during these tests. While the balancer was in use, on the other hand, indications typical of whirl were not seen. The less erratic, and overall decreased torque readings observed during these experiments are illustrated by the graph shown in FIG. 10.

The invention disclosed herein presents a technique which can effectively reduce or prevent vibrations or backward whirl which would otherwise result from mass or drilling force imbalance. It is contemplated that this invention possibly will not counteract backwards whirl once it has started; however, it is further contemplated that a bit's whirling tendency will be reduced with the present invention because drilling force imbalance is a major contributing factor to a bit's tendency to whirl. The invention disclosed herein is contemplated to have its principal application at high bit rotary speeds, but it likely can also be useful in reducing vibrations in lower speed applications. Even in such lower rotary speed applications, when the drill string is rotated above its critical speed, it will have a tendency to vibrate. Installation of a self-balancing apparatus as described hereinabove at several places on the drillstring such as the drill pipe, drill collar, and bottomhole assembly, would reduce the drillstring's tendency to bow out and, thus, would reduce harmful vibrations.

While presently preferred embodiments of the invention have been described herein for the purpose of disclosure, numerous changes in the construction and arrangement of parts will suggest themselves to those skilled in the art, which changes are encompassed within the spirit of this invention as defined by the appended claims.

What is claimed is:

1. A self-balancing apparatus for automatically compensating certain imbalances which tend to cause vibrations in a rotating drill bit, said apparatus comprising:

a support body including two ends and first and second circular races defined circumferentially around said support body, said first race disposed near one end of said support body and said second race disposed nearer the other end of said support body;

a fluid received in said first race;

a fluid received in said second race;

pressure compensating means for compensating for pressure differentials between said fluids and a fluid external to said support body;

a first plurality of movable balls or rollers disposed in said first race;

a second plurality of movable balls or rollers disposed in said second race;

a first sleeve receiving the portion of said support body where said first race is defined; and a second sleeve receiving the portion of said support body where said second race is defined.

2. An apparatus as defined in claim 1, wherein:

said support body has an aperture defined therein and two channels defined therein, one of said channels communicating said first race with said aperture and the other of said channels communicating said second race with said aperture; and said pressure compensating means includes:

said aperture and said two channels; and a piston movably and sealingly received in said aperture.

* * * * *